US011281471B2

United States Patent
Samuel et al.

(10) Patent No.: US 11,281,471 B2
(45) Date of Patent: Mar. 22, 2022

(54) SYSTEMS AND METHODS FOR MINIMIZING BOOT TIME AND MINIMIZING UNAUTHORIZED ACCESS AND ATTACK SURFACE IN BASIC INPUT/OUTPUT SYSTEM

(71) Applicant: Dell Products L.P., Round Rock, TX (US)

(72) Inventors: Balasingh P. Samuel, Round Rock, TX (US); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 16/791,843

(22) Filed: Feb. 14, 2020

(65) Prior Publication Data
US 2021/0255872 A1    Aug. 19, 2021

(51) Int. Cl.
*G06F 9/44* (2018.01)
*G06F 21/57* (2013.01)
*G06F 9/4401* (2018.01)

(52) U.S. Cl.
CPC ............ *G06F 9/441* (2013.01); *G06F 21/572* (2013.01); *G06F 2221/033* (2013.01)

(58) Field of Classification Search
CPC .. G06F 9/441; G06F 21/572; G06F 2221/033; G06F 21/575
USPC .................................................. 713/1, 2, 100
See application file for complete search history.

(56) References Cited

U.S. PATENT DOCUMENTS 8,510,543 B1 *   8/2013  Shankar .................. G06F 9/441
                                                                         713/2
2019/0377583 A1 * 12/2019  Kumar ..................... G06F 21/44

* cited by examiner

*Primary Examiner* — Michael J Brown
(74) *Attorney, Agent, or Firm* — Jackson Walker L.L.P.

(57) ABSTRACT

An information handling system may include a processor and a basic input/output system communicatively coupled to the processor and comprising a plurality of firmware volumes embodied in non-transitory computer readable media, each firmware volume comprising executable code for a respective functionality of the basic input/output system, wherein the basic input/output system is configured to, based on the presence or absence of an action or event associated with the basic input/output system, select a boot path for execution from a plurality of boot paths, each of the plurality of boot paths comprising a respective trust chain of a subset of the plurality of firmware volumes and execute the boot path selected.

21 Claims, 2 Drawing Sheets

SYSTEMS AND METHODS FOR MINIMIZING BOOT TIME AND MINIMIZING UNAUTHORIZED ACCESS AND ATTACK SURFACE IN BASIC INPUT/OUTPUT SYSTEM

TECHNICAL FIELD

The present disclosure relates in general to information handling systems, and more specifically to minimizing boot time of an information handling system and minimizing unauthorized access to and an attack surface of a basic input/output system of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system component known as a basic input/output system (BIOS) may be configured to identify, test, and/or initialize information handling resources of an information handling system. "BIOS" may broadly refer to any system, device, or apparatus configured to perform such functionality, including without limitation, a Unified Extensible Firmware Interface (UEFI). BIOSes are becoming increasingly complex, and pre-boot feature sets of BIOSes and advanced integrated devices of BIOSes may significantly increase boot time of an information handling system even when computing power of an information handling system is modestly increased. Such pre-boot feature sets are often seen as important, and may include security, manageability, and advanced serviceability features. However, such features increase required code storage space and may undesirably increase boot time, especially in the face of consumer expectations of short (or nonexistent) boot times.

A large amount of BIOS code (e.g., Preboot configuration utility, advanced diagnostics module, etc.) loaded in a random access memory of an information handling system may also present an opportunity for exploitation and circumvention of BIOS security leading to an unauthorized boot. The attack vector may increase as a number of BIOS and preboot applications increases.

SUMMARY

In accordance with the teachings of the present disclosure, the disadvantages and problems associated with information handling system boot times and attack surfaces of BIOS have been reduced or eliminated.

In accordance with embodiments of the present disclosure, an information handling system may include a processor and a basic input/output system communicatively coupled to the processor and comprising a plurality of firmware volumes embodied in non-transitory computer readable media, each firmware volume comprising executable code for a respective functionality of the basic input/output system, wherein the basic input/output system is configured to, based on the presence or absence of an action or event associated with the basic input/output system, select a boot path for execution from a plurality of boot paths, each of the plurality of boot paths comprising a respective trust chain of a subset of the plurality of firmware volumes and execute the boot path selected.

In accordance with these and other embodiments of the present disclosure, a method may include, in a basic input/output system communicatively coupled to the processor and comprising a plurality of firmware volumes embodied in non-transitory computer readable media, each firmware volume comprising executable code for a respective functionality of the basic input/output system, wherein the basic input/output system is configured to, based on the presence or absence of an action or event associated with the basic input/output system: selecting a boot path for execution from a plurality of boot paths, each of the plurality of boot paths comprising a respective trust chain of a subset of the plurality of firmware volumes and executing the boot path selected.

In accordance with these and other embodiments of the present disclosure, an article of manufacture may include a computer readable medium and computer-executable instructions carried on the computer readable medium, the instructions readable by a processor, the instructions, when read and executed, for causing the processor to, in a basic input/output system communicatively coupled to the processor and comprising a plurality of firmware volumes embodied in non-transitory computer readable media, each firmware volume comprising executable code for a respective functionality of the basic input/output system, wherein the basic input/output system is configured to, based on the presence or absence of an action or event associated with the basic input/output system, select a boot path for execution from a plurality of boot paths, each of the plurality of boot paths comprising a respective trust chain of a subset of the plurality of firmware volumes and execute the boot path selected.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
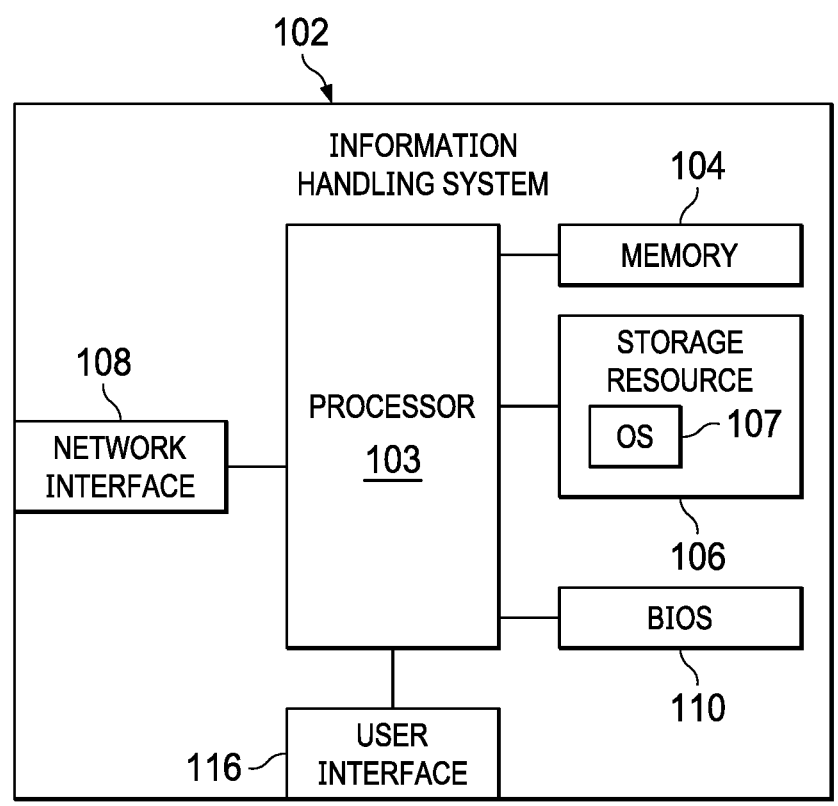
FIG. 1 illustrates a block diagram of an example information handling system adapted for preboot healing of platform issues that cause operating system stop error code crashes, in accordance with certain embodiments of the present disclosure.
Figure 2:
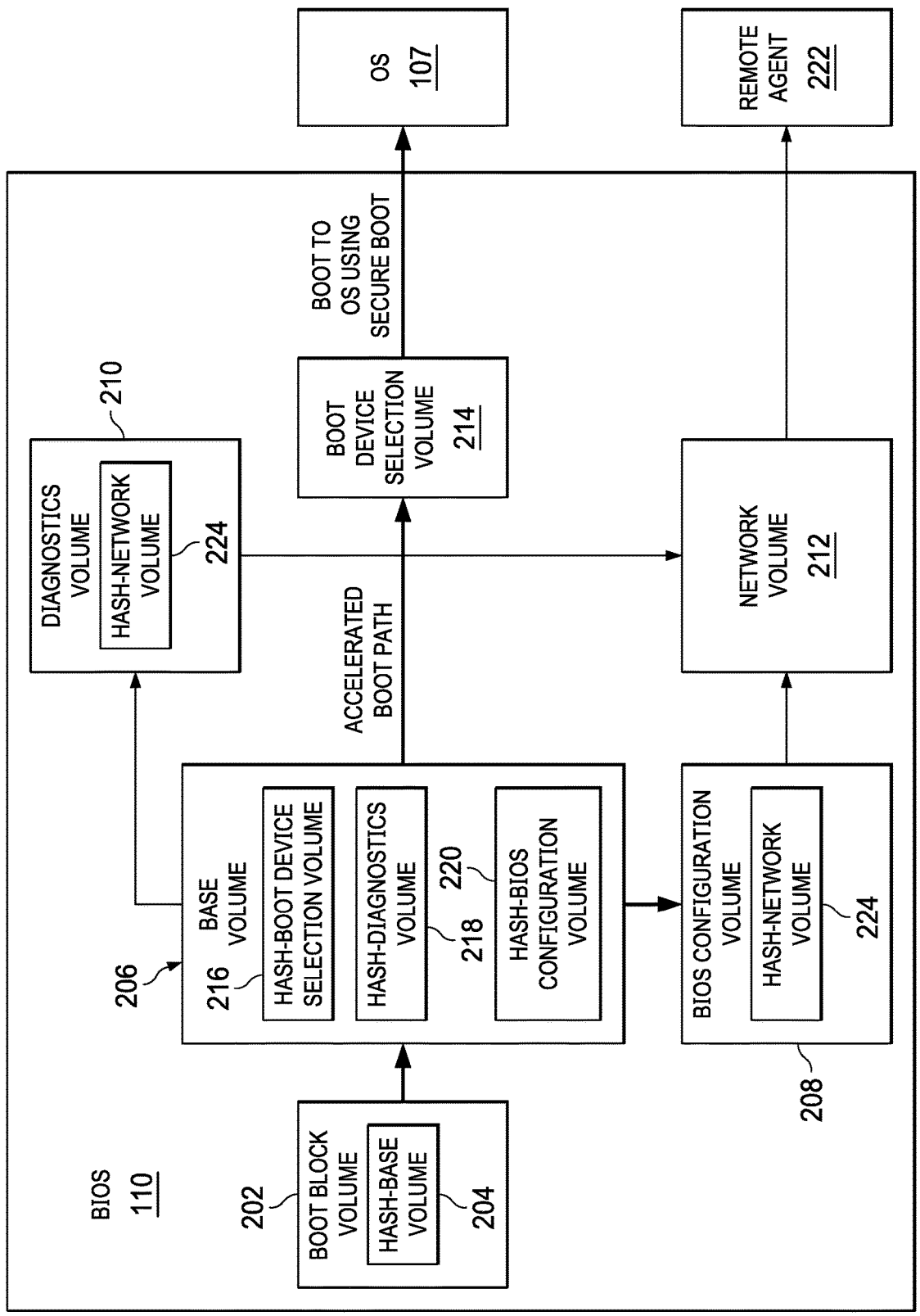
FIG. 2 illustrates a block diagram of BIOS components and firmware volumes, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

FIG. 1 illustrates a block diagram of an example information handling system 102 adapted for preboot healing of platform issues that cause operating system stop error code crashes, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside internal to a chassis or other enclosure comprising information handling system 102.

As shown in FIG. 1, storage resource 106 may have stored thereon an operating system (OS) 107. Operating system 107 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by OS 107. Active portions of OS 107 may be transferred from storage resource 106 to memory 104 for execution by processor 103.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

In operation, BIOS 110 may be intelligently organized into multiple firmware volumes and BIOS 110 may be configured to manage the firmware volumes to minimize boot time. To illustrate, some BIOS firmware code may not be needed during a particular boot session. For example, during a "regular" boot of BIOS 110 to OS 107, BIOS firmware code that may not be needed may include on-board diagnostics drivers, network drivers and Internet connectivity functionality, and advanced graphics drivers. Accordingly, BIOS 110 may include multiple firmware volumes and BIOS 110 may be configured with an accelerated boot path to OS 107 for a "regular" boot and one or more exceptional boot paths for "non-regular" boot of information handling system 102, wherein each boot path loads only those firmware volumes needed.

FIG. 2 illustrates a block diagram of BIOS components and firmware volumes, in accordance with certain embodiments of the present disclosure. As shown in FIG. 2, BIOS 110 may include a plurality of firmware volumes, for example a bootblock volume 202, a base volume 206, a BIOS configuration volume 208, a diagnostics volume 210, a network volume 212, and a boot device selection volume 214.

Bootblock volume 202 may comprise executable code associated with a bootblock of BIOS 110, and may be the first or one of the first portions of BIOS 110 to execute during any boot. Thus, bootblock volume 202 may always be loaded and executed in every boot of information handling system 102. As shown in FIG. 2, bootblock volume 202 may include a hash 204 for base volume 206. Accordingly, during each boot, bootblock volume 202 may use hash 204 to verify base volume 206, and may load and execute base volume 206 in response to verification.

Base volume 206 may comprise executable code including all necessary drivers required for a regular boot of information handling system 102 (e.g., network drivers, external port drivers, etc. may be excluded). As shown in FIG. 2, base volume 206 may include a plurality of hashes, including a hash 216 for boot device selection volume 214, a hash 218 for diagnostics volume 210, and a hash 220 for configuration volume 208. Base volume 206 may be configured to, based on some event or action (or lack of event or action) select a boot path and load/execute other firmware volumes in accordance with the selected boot path.

For example, if during a boot an action occurs indicating a desire or need to execute diagnostics firmware (e.g., such action including user input such as an interaction with appropriate hot keys), base volume 206 may select the exception boot path of diagnostics volume 210, and may use hash 218 to verify diagnostics volume 210 before loading and executing diagnostics volume 210. As another example, if during a boot an action occurs indicating a desire or need to execute BIOS configuration firmware (e.g., such action including user input such as an interaction with appropriate hot keys), base volume 206 may select the exception boot path of BIOS configuration volume 208, and may use hash 220 to verify BIOS configuration volume 208 before loading and executing BIOS configuration volume 208.

Firmware volumes other than base volume 206 may also included hashes for loading other firmware volumes. For example, each of BIOS configuration volume 208 and diagnostics volume 210 may include a hash 224 for network volume 212, such that BIOS configuration volume 208 or diagnostics volume 210 may use hash 224 to verify and load network volume 212 in order to execute network drivers for communicatively coupling information handling system 102 to a remote agent 222 or other remote resource for carrying out diagnostics and/or BIOS configuration. In addition, although not shown in FIG. 2, base volume 206 may also include a hash 224 for network volume 212, such that base volume 206 may use hash 224 to verify and load network volume 212 when needed or desired (e.g., for firmware update).

During a regular boot of information handling system 102 (e.g., lack of user action indicating a desire or need to execute diagnostics or configuration), base volume 206 may select an exception boot path of boot device selection volume 214, and may use hash 216 to verify boot device selection volume 214 before loading and executing boot device selection volume 214. Boot device selection volume 214 may in turn be configured to boot to OS 107 (e.g., in some embodiments, using SecureBoot or other mechanism for securely booting to OS 107).

Accordingly, firmware volumes may be loaded and executed on an on-demand basis, meaning that for some boots of information handling system 102, boot time may be minimized due to a minimum amount of firmware code being loaded.

In addition, BIOS 110 may be configured to manage firmware volumes through a one-to-many firmware volume trust chain linking. For example, BIOS 110 may perform volume trust chain linking in accordance with the trust chain mapping table shown below:

| Action/Event | Firmware volume trust chain link | | | | Result |
|---|---|---|---|---|---|
| None | Boot-block | Base | Boot Device Selection | | Boot to OS |
| POST error | Boot-block | Base | Diagnostics | Network | Execute diagnostics |
| Firmware Update | Boot-block | Base | | | Update firmware |
| User selects BIOS setup | Boot-block | Base | BIOS Configuration | | BIOS Setup Configuration Utility |
| User selects on-board diagnostics | Boot-block | Base | Diagnostics | | |
| Network Firmware Update | Boot-block | Base | Network | | |
| One-time boot action | Boot-block | Base | BIOS Configuration | Boot Device Selection | |

The various hashes and trust chains may be built during build time of OS 107. BIOS 110 may be organized in any suitable number of firmware volumes by linking integrity trust chains with multiple paths.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a basic input/output system communicatively coupled to the processor and comprising a plurality of firmware volumes embodied in non-transitory computer readable media, each firmware volume comprising executable code for a respective functionality of the basic input/output system, wherein the basic input/output system is configured to, based on the presence or absence of an action or event associated with the basic input/output system:
   select a boot path for execution from a plurality of boot paths, each of the plurality of boot paths comprising a respective trust chain for a subset of the plurality of firmware volumes wherein each firmware volume prior to a last firmware volume in each subset of the plurality of firmware volumes includes a hash value for verifying a next firmware volume in the respective trust chain; and
   execute the boot path selected.

2. The information handling system of claim 1, wherein the plurality of boot paths comprises an accelerated boot path for booting to an operating system of the information handling system.

3. The information handling system of claim 2, wherein the accelerated boot path excludes firmware volumes of the plurality of firmware volumes for performing configuration of the basic input/output system.

4. The information handling system of claim 2, wherein the accelerated boot path excludes firmware volumes of the plurality of firmware volumes for performing diagnostics of the information handling system.

5. The information handling system of claim 1, wherein the plurality of boot paths comprises an exception boot path for performing configuration of the basic input/output system.

6. The information handling system of claim 1, wherein the plurality of boot paths comprises an exception boot path for performing diagnostics of the information handling system.

7. The information handling system of claim 1, wherein the plurality of firmware volumes comprises a base firmware volume configured to, based on the presence or absence of the action or event associated with the basic input/output system, select another firmware volume for execution from a plurality of other firmware volumes and wherein each of the plurality of boot paths includes the base volume within its subset of firmware volumes.

8. A method comprising, in a basic input/output system communicatively coupled to a processor and comprising a plurality of firmware volumes embodied in non-transitory computer readable media, each firmware volume comprising executable code for a respective functionality of the basic input/output system, wherein the basic input/output system is configured to, based on the presence or absence of an action or event associated with the basic input/output system:
  selecting a boot path for execution from a plurality of boot paths, each of the plurality of boot paths comprising a respective trust chain of a subset of the plurality of firmware volumes wherein each firmware volume prior to a last firmware volume in each subset of the plurality of firmware volumes includes a hash value for verifying a next firmware volume in the respective trust chain; and
  executing the boot path selected.

9. The method of claim 8, wherein the plurality of boot paths comprises an accelerated boot path for booting to an operating system of an information handling system.

10. The method of claim 9, wherein the accelerated boot path excludes firmware volumes of the plurality of firmware volumes for performing configuration of the basic input/output system.

11. The method of claim 9, wherein the accelerated boot path excludes firmware volumes of the plurality of firmware volumes for performing diagnostics of the information handling system.

12. The method of claim 8, wherein the plurality of boot paths comprises an exception boot path for performing configuration of the basic input/output system.

13. The method of claim 8, wherein the plurality of boot paths comprises an exception boot path for performing diagnostics of the information handling system.

14. The method of claim 8, wherein the plurality of firmware volumes comprises a base firmware volume configured to, and the method further comprises, based on the presence or absence of the action or event associated with the basic input/output system, selecting, by the base firmware volume, another firmware volume for execution from a plurality of other firmware volumes and wherein each of the plurality of boot paths includes the base volume within its subset of firmware volumes.

15. An article of manufacture comprising:
a non-transitory computer readable medium; and
computer-executable instructions carried on the computer readable medium, the instructions readable by a processor, the instructions, when read and executed, for causing the processor to, in a basic input/output system communicatively coupled to the processor and comprising a plurality of firmware volumes embodied in non-transitory computer readable media, each firmware volume comprising executable code for a respective functionality of the basic input/output system, wherein the basic input/output system is configured to, based on the presence or absence of an action or event associated with the basic input/output system:
select a boot path for execution from a plurality of boot paths, each of the plurality of boot paths comprising a respective trust chain of a subset of the plurality of firmware volumes wherein each firmware volume prior to a last firmware volume in each subset of the plurality of firmware volumes includes a hash value for verifying a next firmware volume in the respective trust chain; and
execute the boot path selected.

16. The article of claim 15, wherein the plurality of boot paths comprises an accelerated boot path for booting to an operating system of an information handling system.

17. The article of claim 16, wherein the accelerated boot path excludes firmware volumes of the plurality of firmware volumes for performing configuration of the basic input/output system.

18. The article of claim 16, wherein the accelerated boot path excludes firmware volumes of the plurality of firmware volumes for performing diagnostics of the information handling system.

19. The article of claim 15, wherein the plurality of boot paths comprises an exception boot path for performing configuration of the basic input/output system.

20. The article of claim 15, wherein the plurality of boot paths comprises an exception boot path for performing diagnostics of the information handling system.

21. The article of claim 15, wherein the plurality of firmware volumes comprises a base firmware volume configured to, and the instructions further cause the processor to, based on the presence or absence of the action or event associated with the basic input/output system, select, by the base firmware volume, another firmware volume for execution from a plurality of other firmware volumes and wherein each of the plurality of boot paths includes the base volume within its subset of firmware volumes.

* * * * *